United States Patent
Edwards et al.

(10) Patent No.: US 7,027,663 B2
(45) Date of Patent: Apr. 11, 2006

(54) MASKING TOOL

(75) Inventors: Eric Edwards, San Francisco, CA (US); Clay Harvey Fisher, Belmont, CA (US); Kurt Jonach, San Jose, CA (US); Neal Jacob Manowitz, Mahwah, NJ (US); John Tree, San Francisco, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 733 days.

(21) Appl. No.: 09/782,235

(22) Filed: Feb. 12, 2001

(65) Prior Publication Data

US 2002/0093514 A1 Jul. 18, 2002

Related U.S. Application Data

(60) Provisional application No. 60/181,778, filed on Feb. 11, 2000.

(51) Int. Cl.
*G06K 9/20* (2006.01)
(52) U.S. Cl. .............. 382/283; 382/212; 382/213; 358/517; 358/464
(58) Field of Classification Search ........... 382/190, 382/212, 213, 282, 283, 307, 144; 358/515–517, 358/453, 538, 464; 345/626, 563; 348/661, 348/841; 355/74
See application file for complete search history.

(56) References Cited

U.S. PATENT DOCUMENTS

| | | | | |
|---|---|---|---|---|
| 5,283,560 A | * | 2/1994 | Bartlett ....................... 345/729 |
| 5,459,586 A | * | 10/1995 | Nagasato et al. ........... 358/450 |
| 5,533,185 A | * | 7/1996 | Lentz et al. ................. 345/563 |
| 5,594,850 A | * | 1/1997 | Noyama et al. ............. 345/632 |
| 5,617,114 A | * | 4/1997 | Bier et al. ................... 345/634 |
| 5,651,107 A | * | 7/1997 | Frank et al. ................. 345/768 |
| 5,920,659 A | * | 7/1999 | Iverson et al. .............. 382/298 |
| 6,118,427 A | * | 9/2000 | Buxton et al. .............. 345/629 |
| 6,300,955 B1 | * | 10/2001 | Zamir .......................... 382/283 |
| 6,429,881 B1 | * | 8/2002 | Olsen, IV .................... 345/762 |
| 6,485,869 B1 | * | 11/2002 | Tsai et al. ........................ 430/5 |
| 6,529,208 B1 | * | 3/2003 | Chun et al. .................. 345/629 |

* cited by examiner

*Primary Examiner*—Samir Ahmed
*Assistant Examiner*—Yosef Kassa
(74) *Attorney, Agent, or Firm*—Blakely, Sokoloff, Taylor & Zafman LLP

(57) ABSTRACT

A method and system of masking comprising: positioning a masking tool over a masked portion of an image; applying an effect onto the image outside the masked portion; and dynamically moving the masking tool while applying the effect wherein the masked portion changes as the masking tool is dynamically moved.

24 Claims, 6 Drawing Sheets

MASKING TOOL

RELATED APPLICATIONS

This application claims the benefit of U.S. Provisional Application No. 60/181,778, filed on Feb. 11, 2000.

COPYRIGHT NOTICE/PERMISSION

A portion of the disclosure of this patent document may contain material which is subject to copyright protection. The copyright owner has no objection to the facsimile reproductions by anyone of the patent document or the patent disclosure as it appears in the patent in trademark office patent file or records, the otherwise reserves all copyrights whatsoever. The following notice applies to software and data as described below and in the drawings hereto: Copyright 2001, Sony electronics Inc., All Rights Reserved.

FIELD OF THE INVENTION

This invention relates generally to graphical editing technologies, and more particularly, to controlling applications of effects by using masking tools.

BACKGROUND OF THE INVENTION

With the increasing popularity of computing and the use of the Internet in many fields, the ability to control computers and similar devices and in a simple, convenient manner becomes extremely important. However, existing interfaces to computers and similar devices can be cumbersome and complicated.

In particular, many users of graphical editing programs would benefit from an improved interface used to control the application of various special effects onto an image. For example, graphical editing programs would benefit from improved control of the application of the effects with respect to the intensity and the area of the image that is being subjected to modification by application of the effect.

Some software applications implement mask tools that are similar to applying a cut out or stencil to protecting area of the underlying image. They also implement control that applies effects only to a localized area, similar to a street paint tool.

SUMMARY OF THE INVENTION

A method and system of masking comprising: positioning a masking tool over a masked portion of an image; applying an effect onto the image outside the masked portion; and dynamically moving the masking tool while applying the effect wherein the masked portion changes as the masking tool is dynamically moved.

DETAILED DESCRIPTION OF THE INVENTION

In the following detailed description of the embodiments of the invention, reference is made to the accompanying drawings in which like references indicate similar elements, in which, is shown by way of illustration of specific embodiments in which the invention may be practiced. These embodiments are described in sufficient detail to enable those skilled in the art to practice the invention and is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

Figure 1A:
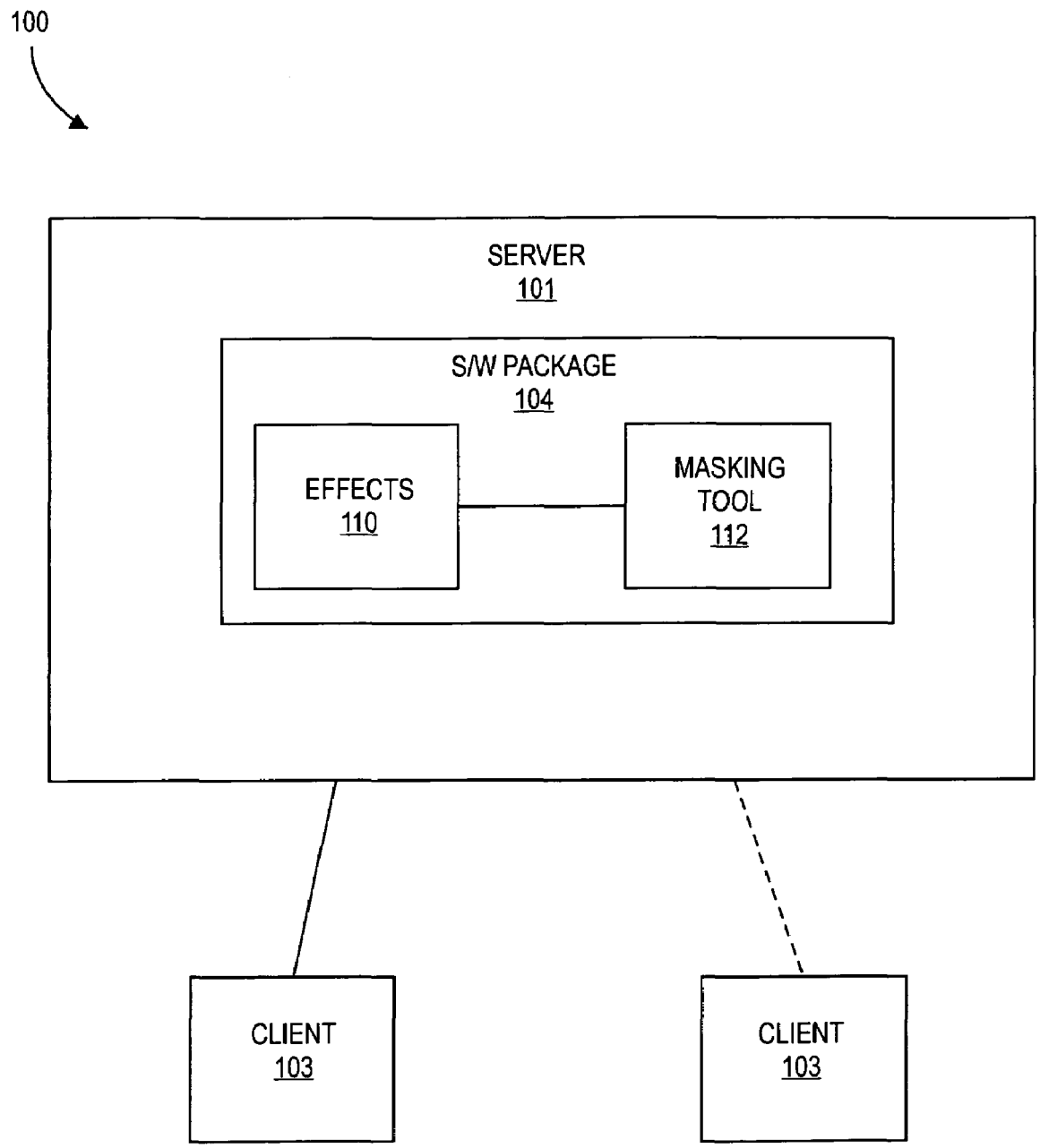
FIG. 1A illustrates a basic system of the present invention.

Beginning with an overview of the operation of the invention, FIG. 1A illustrates system 100 which can control the effects of image manipulation according to one embodiment of the present invention. System 100 includes server 101 and one or more clients 103. Within the server 101, a typical software application 104 resides. In this embodiment, the software application 104 is an image editing package to manipulate graphical images. Within the software application 104, an effects block 110 and a masking tool block 112 reside. The effects block 110 applies a specific effect to the image and the masking tool block 112 selectively limits the area of the image which is modified by the effects block 110.

Clients 103 represent any device that may enable user's online access to information. In this embodiment, client 103 may provide a user interface to communicate information to the user. It should be noted that although FIG. 1A illustrates only two modules performing the above functionality, more or less modules may be used to perform this functionality.

Figure 1B:
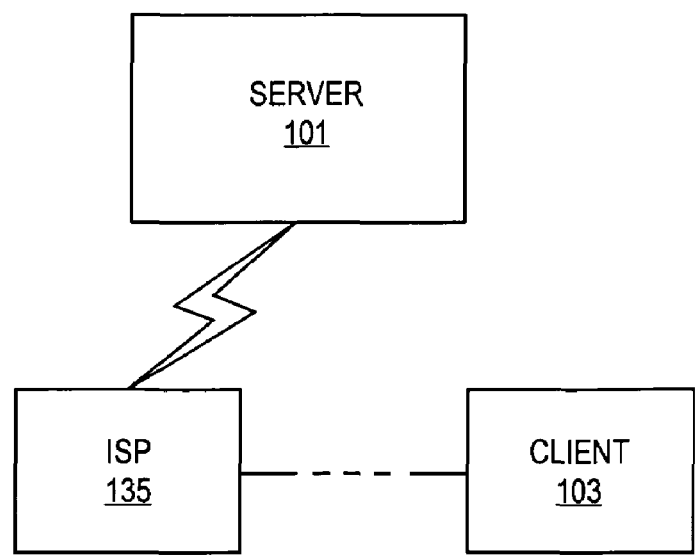
FIG. 1B illustrates a network overview of the present invention.

In one embodiment, as shown in FIG. 1B, server 101 hosts a web site and is part of or coupled to an Internet Service Provider 135 to provide services over the Internet. The client computer 103 executes a conventional Internet browsing application to exchange data with the server 101. It is readily apparent that the present invention is not limited to Internet access and Internet Web based sites; directly coupled and private networks are also contemplated.

Figure 1C:
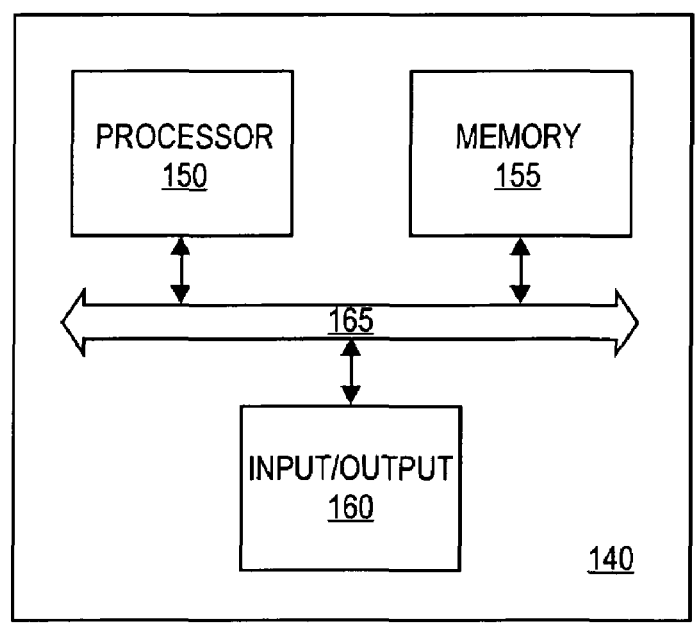
FIG. 1C illustrates a basic processor of the present invention.

One embodiment of computer system 140 suitable for use as a server 101 is illustrated in FIG. 1C. In some embodiments, in which client 103 is a computer, computer system 140 may be suitable for use as a client 103. Computer system 140, includes processor 150, memory 155 and input/output capability 160 coupled to system bus 165. Memory 155 is configured to store instructions which, when executed by processor 150, perform the steps described herein. Input/output 160 provides for the delivery and display at information to others. Input/output 160 also encompasses various types of computer readable media, including any type of storage device that is accessible by the processor 150. One of the skilled the art will immediately recognize that the term computer readable media further encompasses a carrier ways that enclosed a data signal. It will also be appreciated that the server 101 is controlled by operating system software executing and memory 155. Input/output and related media 160 store the computer executable instructions for the operating system and methods of the present invention.

The description of FIGS. 1B and 1C are intended to provide an overview of computer hardware and other operating components suitable for implementing the invention, but is not intended to limit the application environments. It would be appreciated that computer system 140 is one example of many possible computer systems to have different architectures. A typical computer system will usually include at least a processor, memory, any bus coupling the memory to the processor. One of skill in the art will immediately appreciate that the invention can be practiced with other computer system configurations including microprocessor systems, minicomputers, mainframe computers, and the like. The invention can also be practiced in distributed computing environments where tasks are performed by remote processing devices are linked through communications network.

Figure 2A:
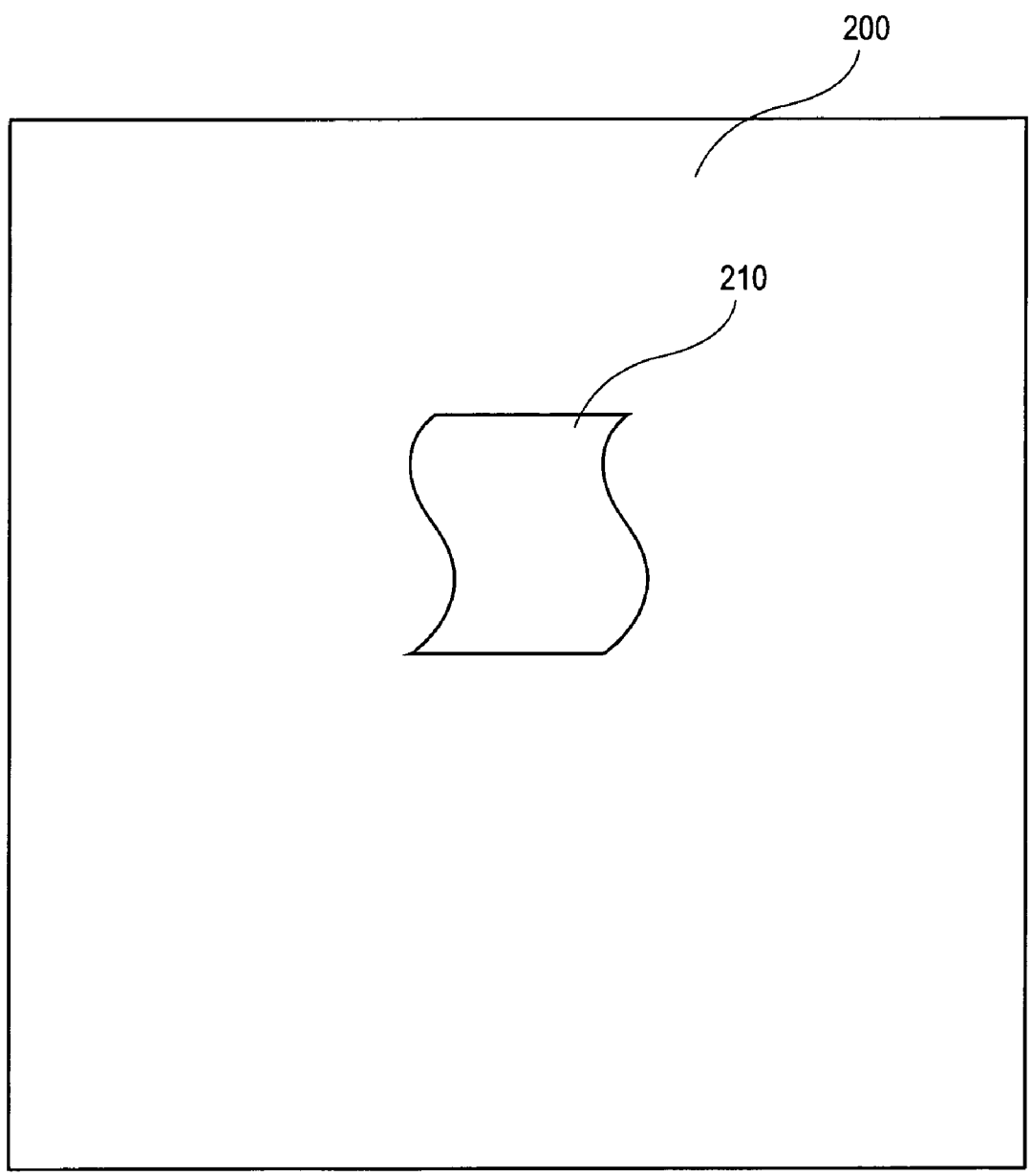
FIG. 2A illustrates one embodiment of the present invention.

FIG. 2A illustrates one embodiment of the masking tool as described in block 112 (FIG. 1A). Display 200 represents a sample screen while utilizing the software application 104 (FIG. 1A). A masking tool 210 is shown on the display 200. The masking tool 210 is translucent and is defined by the clear outline. The masking tool 210 allows a selective application effects from the effects block 110 (FIG. 1A) by moving the masking tool 210 with respect to a static image as shown on the display 200. The portion of the static image as shown on the display 200 which is within the masking tool 210 is not modified by the application of the effects.

Furthermore, the masking tool 210 is capable of being dynamically moved with respect to the static image during the application of the effects. This allows the user to selectively apply the effect by interactively moving the mask tool simultaneously while applying the effect.

Another embodiment includes a masking tool that is able to interract directly with a localized image editing operation. For example, the masking tool may become entirely transparent in the immediate area where a user is currently applying an image effect. This allows the user to see the entire area that is mask without a mask or line obstructing the immediate work area.

Figure 2B:
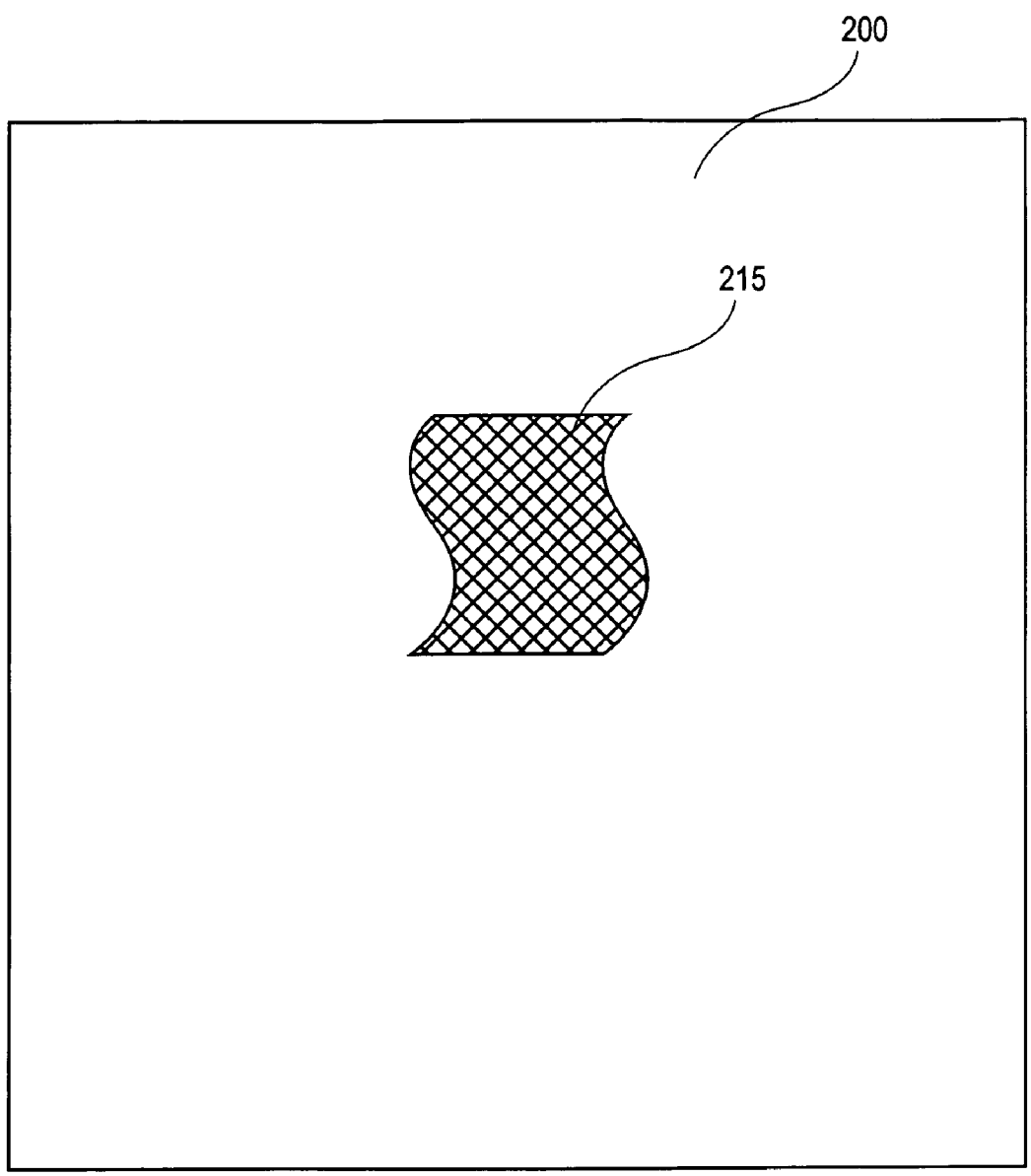
FIG. 2B illustrates another embodiment of the present invention.

FIG. 2B illustrates a masking tool 215 within the display 200. The masking tool 215 shows the portion within the masking tool 215 to have a cross-hatched shading. Any type of shading can be utilized to illustrate the portion within the masking tool.

Figure 2C:
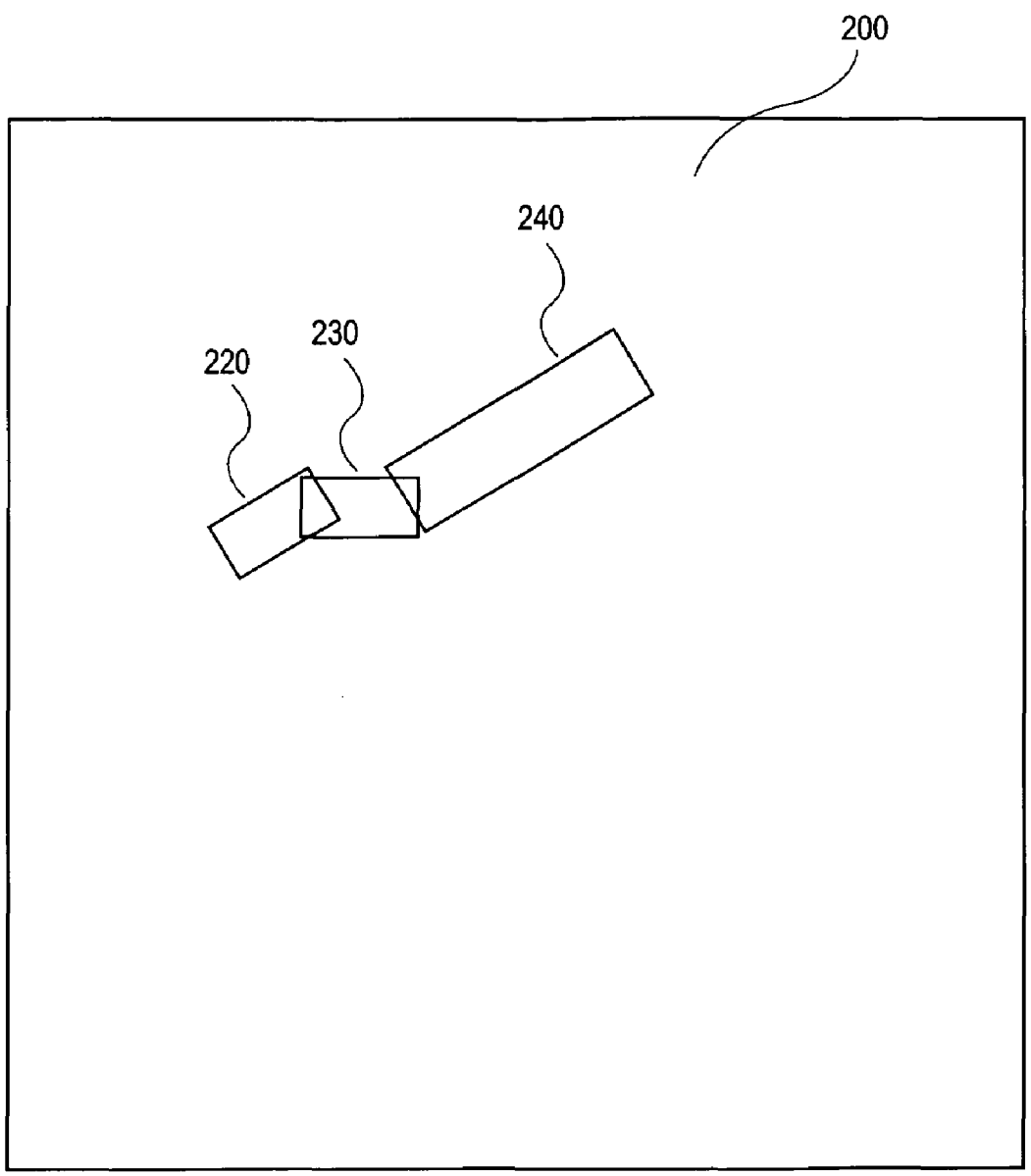
FIG. 2C illustrates another embodiment of the present invention.

FIG. 2C illustrates a masking tool of another embodiment of the present invention. According to this embodiment, the shape of the masking tool can be easily created and modified. For example, within the display 200 there are a first masking tool 220, a second masking tool 230 and a third masking tool 240. Each of the first, second and third masking tools (220, 230, and 240) have differing sizes and may function independently or may be combined to form a single masking tool. Naturally, this specific example utilizes three portions to form independent or combined masking tools and any number of portions may be utilized to accomplish the same.

Like masking tools that take different sizes, masking tools may also take any multitude of shapes. The masking tool may simulates the use a fixed edge such as a French Curve. The shape of the mask tool is infinitely changeable. Furthermore, the user may mask as much area of the image as desired and perform a global image effect on the entire image while protecting portions of the image from the image effects with the masking tools.

Figure 3:
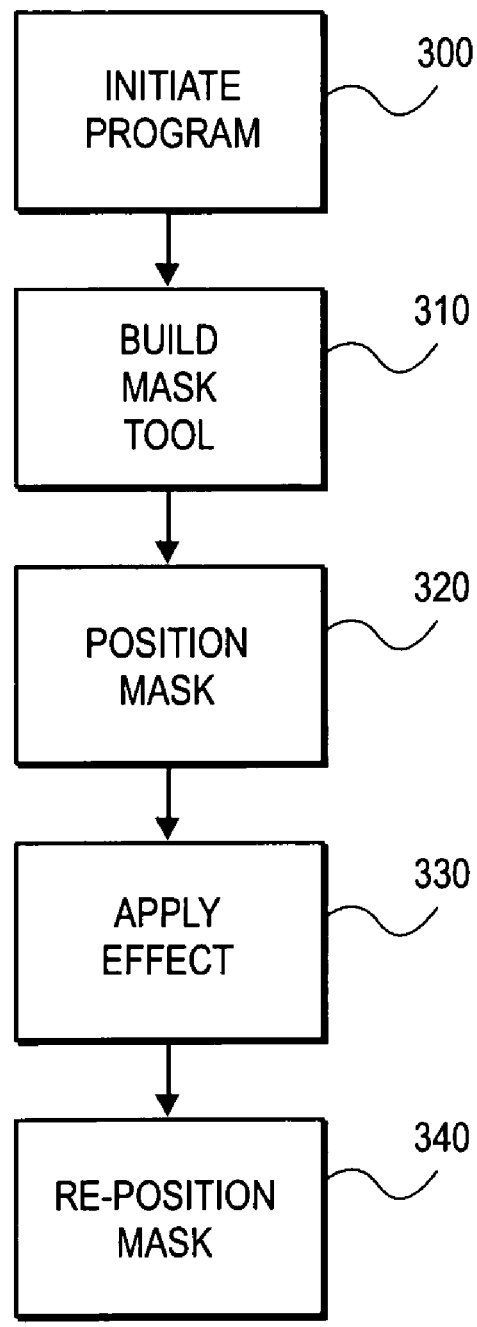
FIG. 3 illustrates a flow diagram of one embodiment.

FIG. 3 illustrates a flow diagram. At block 300, the application software 104 (FIG. 1A) is initiated. The user may build, create, and/or modify the shape and size of the masking tool in Block 310. The user may position the masking tool relative to the static image (Block 320). The user may apply the image effect selectively to the image that is not masked by the masking tool (Block 330). The user may dynamically reposition the masking tool while simultaneously applying the image effect (Block 340).

Although specific embodiments have been illustrated and described herein, will be appreciated by those of ordinary skill in the art that any arrangement which is calculated to achieve the same purpose may be substituted for specific embodiments shown. This application is intended to cover any of the adaptations or variations of the present invention.

The terminology used in this application with respect to network architecture is meant to include all client/server environments. Therefore it is manifestly intended that this invention be limited only by the following claims and equivalents thereof.

What is claimed is:

1. An effects application system comprising:
   an effects source for applying an effect onto an image and
   a masking tool which defines a masked portion that prevents the effect source from applying the effect onto the masked portion of the image, the masking tool dynamically moving within the image in response to user input during the application of the effect, wherein the masked portion of the image is viewable by the user.

2. The effects application system according to claim 1 wherein the masking tool has a customized shape.

3. The effects application system according to claim 1 wherein the masking tool is movable relative to the image.

4. The effects application system according to claim 1 wherein the masking tool simulates a fixed edge.

5. The effects application system according to claim 1 wherein the masked portion of the image is denoted by cross-hatching.

6. The effects application system according to claim 1 wherein the masked portion of the image is denoted by shading.

7. A method of masking comprising:
   positioning a masking tool over a masked portion of an image;
   applying an effect onto the image outside the masked portion; and
   dynamically moving the masking tool within the image while applying the effect in response to user input, wherein the masked portion changes as the masking tool is dynamically moved and the masked portion of the image is viewable by the user.

8. The method according to claim 7 further comprising customizing a shape of the masking tool.

9. The method according to claim 7 wherein the masking tool is translucent.

10. The method according to claim 7 wherein the masked portion of the image is shaded.

11. The method according to claim 7 wherein dynamically moving the masking tool and applying the effect occur simultaneously.

12. The method according to claim 7 farther comprising applying multiple masking tools onto the image.

13. A machine-readable medium having instructions to cause a processor to execute a method comprising:
   positioning a masking tool over a masked portion of an image;
   applying an effect onto the image outside the masked portion; and dynamically moving the masking tool within the image while applying the effect in response to user input, wherein the masked portion changes as the masking tool is dynamically moved and the masked portion of the image is viewable by the user.

14. The machine-readable medium of claim 13, wherein the method further comprises customizing a shape of the masking tool.

15. The machine-readable medium of claim 13, wherein the masking tool is translucent.

16. The machine-readable medium of claim 13, wherein the masked portion of the image is shaded.

17. The machine-readable medium of claim 13, wherein dynamically moving the masking tool and applying the effect occur simultaneously.

18. The machine-readable medium of claim 13, wherein the method further comprises applying multiple masking tools onto the image.

19. A computerized system comprising:
a processor coupled to a memory through a bus; and
an effects application process executed from the memory by the processor to cause the processor to position a masking tool over a masked portion of an image, apply an effect onto the image outside the masked portion, and dynamically move the masking tool within the image while applying the effect in response to user input, wherein the masked portion changes as the masking tool is dynamically moved and the masked portion of the image is viewable by the user.

20. The computerized system of claim 19, wherein the effects application process further causes the processor to customize a shape of the masking tool.

21. The computerized system of claim 19, wherein the masked portion of the image is shaded.

22. The computerized system of claim 19, wherein dynamically moving the masking tool and applying the effect occur simultaneously.

23. The computerized system of claim 19, wherein the effects application process further causes the processor to apply multiple masking tools onto the image.

24. An apparatus comprising:
means for applying an effect onto an image and
means for defining a masked portion that prevents the means for applying from applying the effect onto the masked portion of the image, wherein the means for defining is configured to dynamically move within the image in response to user input during the application of the effect and the masked portion of the image is viewable by the user.

* * * * *